United States Patent [19]

McNatt et al.

[11] 4,428,568

[45] Jan. 31, 1984

[54] FORCE-ABSORBING DEVICE

[75] Inventors: Robert B. McNatt, Relay; John T. Day, Winfield, both of Md.

[73] Assignee: Rubber Millers, Inc., Baltimore, Md.

[21] Appl. No.: 281,388

[22] Filed: Jul. 8, 1981

[51] Int. Cl.³ .............................................. F16F 1/36
[52] U.S. Cl. .................................. 267/140; 114/219; 293/136
[58] Field of Search .............. 188/371, 379, 380, 382; 267/109, 133, 136, 140; 293/136; 114/219

[56] References Cited

U.S. PATENT DOCUMENTS

| | | | |
|---|---|---|---|
| 3,294,254 | 12/1966 | De Ment | 267/140 X |
| 3,473,836 | 10/1969 | Halter | 267/140 X |
| 3,574,379 | 4/1971 | Jordan | 267/140 X |
| 3,857,596 | 12/1974 | Nakamura et al. | 267/140 X |
| 3,999,497 | 12/1976 | Hamel | 267/140 X |

*Primary Examiner*—Duane A. Reger
*Attorney, Agent, or Firm*—A. W. Breiner

[57] ABSTRACT

The disclosed invention relates to a force-absorbing member which is formed of a resilient plastic material having a relatively high tensile strength mounted in a suitable restraining member. The force-absorbing member includes an annular mounting flange which is of sufficient size and the material of the force-absorbing member of sufficient strength to permit the force-absorbing member to readily deflect to one side of its axis during use, and the mounting of the flange is such that the flange will not rupture or pull through the member restraining it against movement. The force-absorbing member may be utilized, inter alia, as a bumper per se, as a support for a bumper, as a combined boat rub-rail and line-attaching member, or as part of a shock-absorbing unit of a tow unit, such as a tow chain.

21 Claims, 11 Drawing Figures

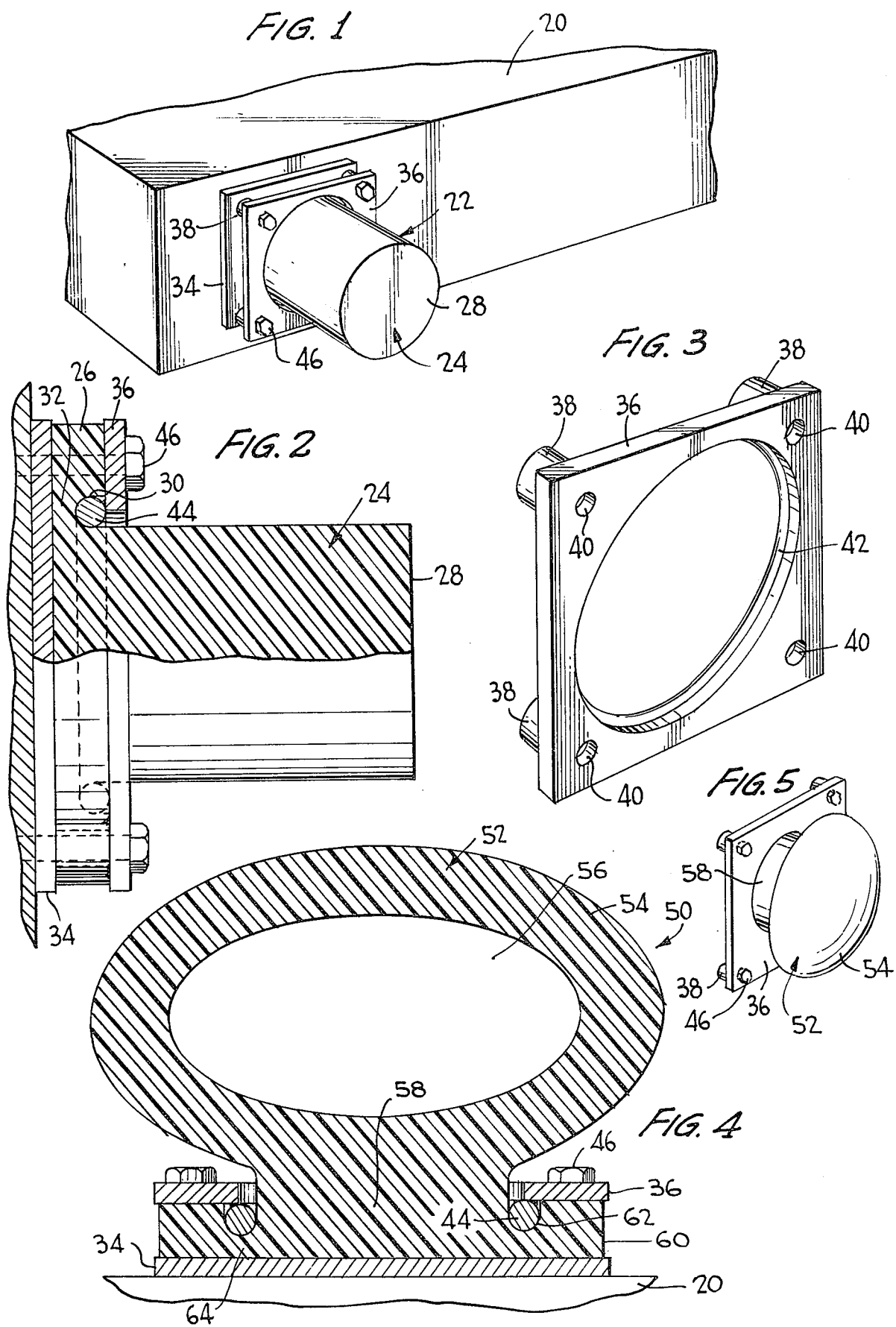

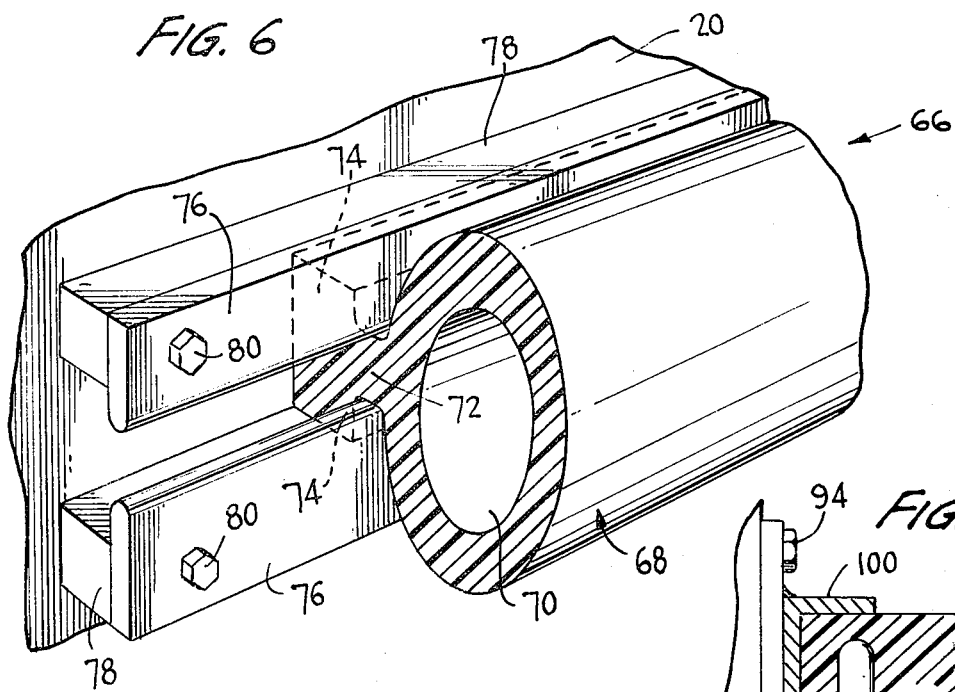
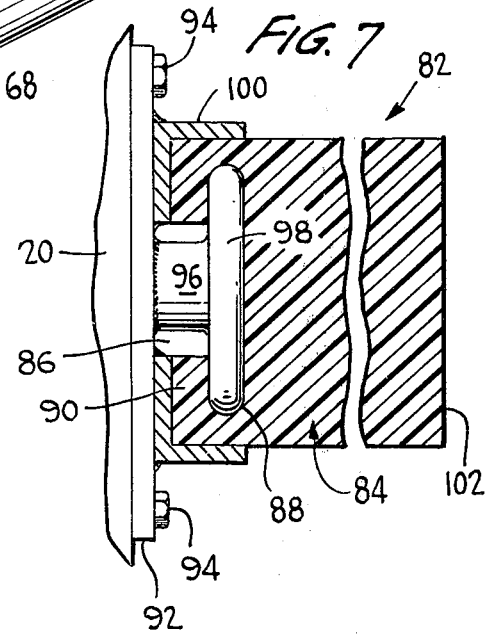
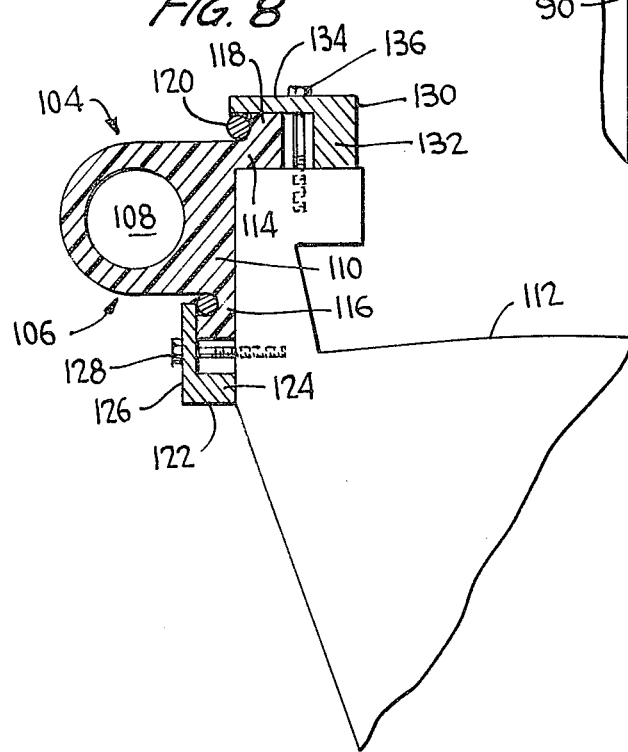

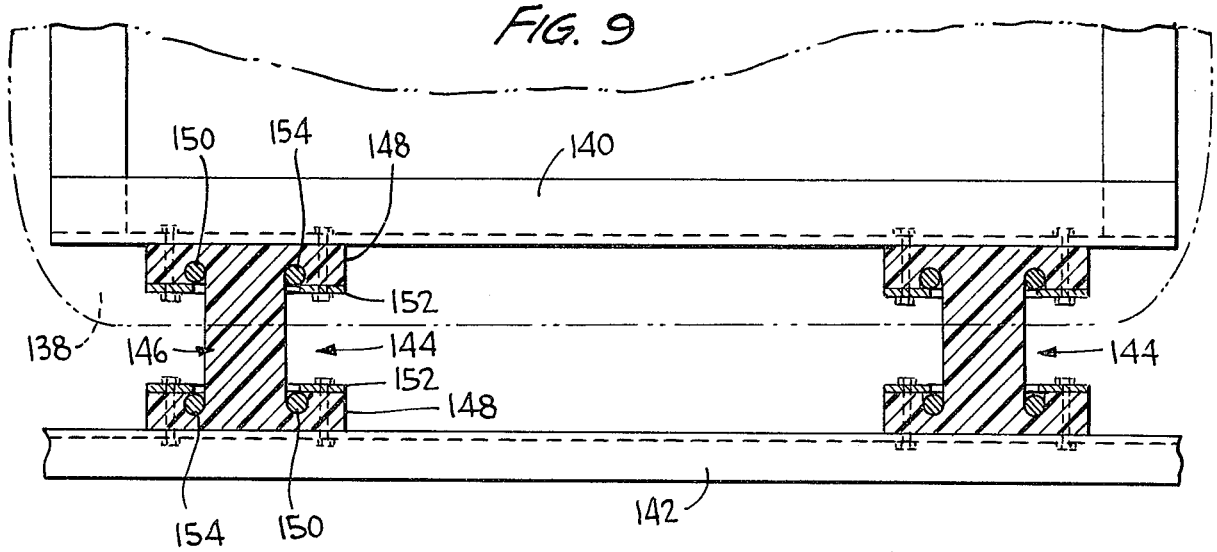
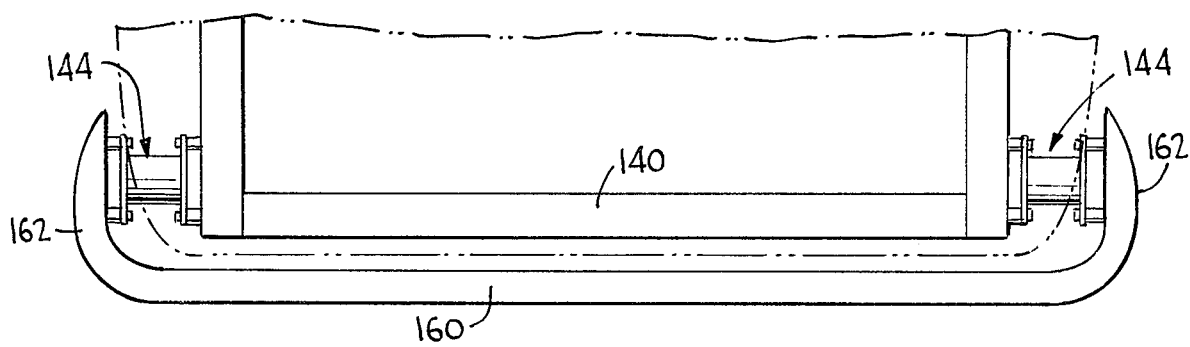
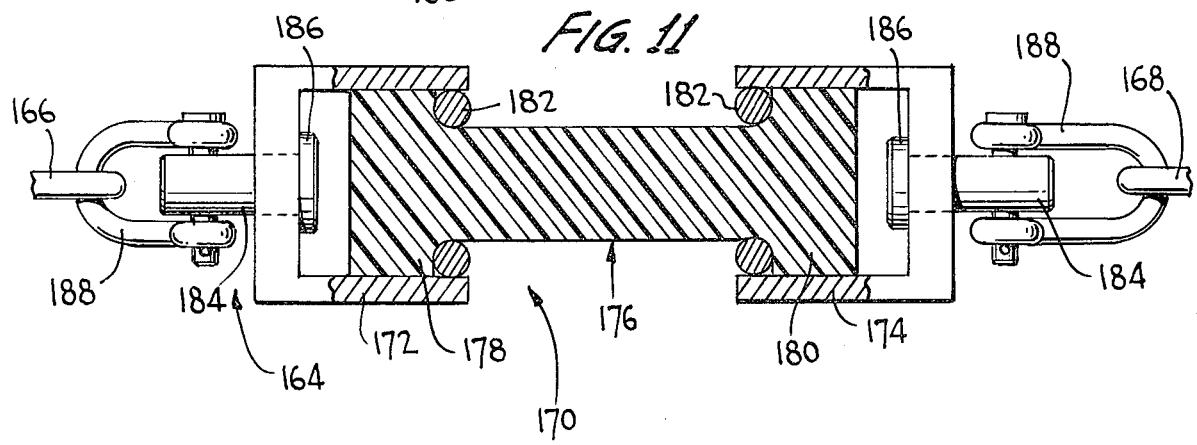

FORCE-ABSORBING DEVICE

This invention relates in general to new and useful improvements in force-absorbing devices, and more particularly to a force-absorbing device which is formed of a resilient plastic material which has high tensile and compressive absorptive characteristics.

This invention primarily relates to new and useful improvements in bumpers, and most particularly to a bumper suitable for a crane mounted on railway tracks or the like. The invention is, however, not so limited and may relate to bumpers which may be utilized in other applications such as vehicles of various types including passenger vehicles. Further, it is feasible to utilize the principles of the invention in conjunction with a boat rub-rail, or as a tension force-absorbing element in a towing or the like device.

There has been previously developed for cranes and the like bumpers in the form of heavy blocks of resilient plastic material which are mounted utilizing a thin, integral mounting flange. However, these blocks have a deficiency in that should the block strike an article at an angle, and the block is deflected towards one side of its axis, an undue force is applied on the mounting flange and the block is torn from its support. Such occurrence with the heretofore existing bumpers is expected to the point that the block is normally provided with a retaining hook and line so that it does not drop and interfere with the movement of the crane.

In accordance with this invention, the bumper or like element is provided with a relatively large restraining flange and there is associated with the restraining flange a restraining member to hold the flange against undesired movement. The restraining flange is of such size and material strength whereby it cannot be pulled through the restraining member and will permit sidewise deflection of the respective force-absorbing member, while preventing the flange from being torn from the force-absorbing member.

As pointed out above, the force-absorbing member may be utilized, with slight modifications, in many environments.

With the above and other objects in view that will hereinafter appear, the nature of the invention will be more clearly understood by reference to the following detailed description, the appended claims, and the several views illustrated in the accompanying drawings.

FIG. 1 is a perspective view of one end of a crane having mouned thereon a bumper formed in accordance with this invention.

FIG. 2 is an enlarged fragmentary side elevational view with parts broken away and shown in section on the bumper of FIG. 1.

FIG. 3 is a perspective view of a clamp plate for clamping the force-absorbing member of the bumper to a backing plate.

FIG. 4 is an enlarged sectional view through a modified form of bumper and shows the general details in cross-section thereof.

FIG. 5 is a perspective view on a reduced scale of the force-absorbing member and clamp plate of the bumper of FIG. 4.

FIG. 6 is a perspective view, with parts broken away and shown in section, of a modified form of bumper which extends longitudinally of a support surface.

FIG. 7 is a sectional view through still another form of bumper.

FIG. 8 is a sectional view through a combined rub-rail and line-receiving cleat for a boat.

FIG. 9 is a plane view, with parts broken away and shown in section, of a mounting for a vehicle bumper incorporating the principles of the invention.

FIG. 10 is another plane view and schematically shows another form of vehicle bumper having side mounts incorporating the spirit of the invention.

FIG. 11 is an enlarged plane view, with parts broken away and partly in section, showing generally the details of a shock-absorbing element of a tow member incorporating the invention.

Referring now to the drawings in detail, reference is first made to FIG. 1 wherein there is illustrated an end portion of a frame 20 of a crane. The crane frame 20 has mounted on a corner thereof a forwardly facing bumper, generally identified by the numeral 22. The bumper 22 is in the form of a relatively large cylindrical block of resilient plastic material such as a polyurethane. This block is in the form of a force-absorbing member 24 which has a forward end 28 and at its opposite end a surrounding mounting or restraining flange 26. The force-absorbing member 24 is square cut at forward end 28 for engaging a suitable stop abutment or similar surface, with the force-absorbing member being resiliently compressed and absorbing the impact.

As illustrated in FIG. 2, there is an annular recess 30 formed in the face of the flange 26 surrounding the force-absorbing member 24. Flange 26 is otherwise integrally joined to the force-absorbing member 24 by an annular, relatively thin connecting portion 32.

The bumper 22, as illustrated in FIGS. 1 and 2, also includes a mounting plate 34 which is secured to the frame 20 by a suitable mounting means including welding. In addition, there is a clamp plate 36, having projecting from the rear surface thereof, spacers 38. Each spacer 38 is tubular and is aligned with a bore 40 through a corner of the clamp plate 36. The clamp plate 36 further includes a central opening 42 of a size to freely receive the force-absorbing member 24.

One of the primary features of the invention is the provision of a restraining member which, as shown in FIGS. 1–4, is in the form of a ring 44. The ring 44 is rigid and is of a size to be received within the annular recess 30, as is best shown in FIG. 2.

When the bumper 22 is assembled and is in place, it is secured in place by four bolts 46 which extend through the openings 40 and the spacers 38, and are threadedly engaged in the mounting plate 34. The spacers 38 permit the clamping plate 36 to apply only a light, compressive force against the flange 26. At the same time, the clamping plate 36 engages the restraining ring 44 in recess 30 and serves to clamp the thinned portion 32 of the flange 26 against the mounting plate 34.

It will be readily apparent from FIG. 2 that the bumper 22 permits force-absorbing member 24 to be directly engaged with the mounting plate 34 so as to apply a force to the frame 20 of the crane when the forward end 28 of the force-absorbing member 24 engages a fixed object. On the other hand, should the engagement of the free end 28 with a fixed object cause the force-absorbing member 24 to be deflected off center of its axis, the thinned ara 32 will permit such deflection. However, flange 26 is sufficiently large to prevent the flange or lump of material 26 from pulling out. Thus, the bumper 22 can absorb considerable abuse without being damaged in that the plastic material from which the force-absorbing member 24 and its integral flange 26 is formed will have the desired tensile strength so as to permit the sidewise deflection of the force-absorbing member 24 without the tearing thereof relative to the flange 26, with the lump of flange material being sufficiently large to prevent pull out.

Reference is now made to FIGS. 4 and 5 wherein there is illustrated a modified form of bumper, generally identified by the numeral 50. The mounting of the bumper 50 is identical with that of the bumper 22, and it differs from the bumper 22 in that a force-absorbing member 52 thereof, in lieu of being a cylindrical block, has a projecting portion 54 which is bulbous in outline and is hollow, with there being a central opening 56. The force-absorbing member 52 has a cylindrical base 58 which corresponds to the inner portion of the force-absorbing member 24, and that base carries a flange 60 identical to the flange 26. The flange 60 is also provided with an annular groove 62 surrounding the base 58 of the force-absorbing member 52, and the flange 60 is joined to the base 58 by a thinned portion 64 base.

It is to be understood that the force-absorbing member 52 may be mounted on a suitable support, such as the frame 20 of the crane of FIG. 1, utilizing the same mounting plate 34, the same clamp plate 36, the same restraining ring 44, and the same fasteners 46. It may be desirable, however, to split plate 36 depending on the size of bulbous member 52. It will, of course, be apparent that the force-absorbing member 52 will have a greater resiliency than the force-absorbing member 24.

Reference is now made to FIG. 6 illustrating another form of bumper, generally identified by the numeral 66. The bumper 66 is intended to be an elongated bumper extending transversely of an associated device. In the illustrated embodiment, the bumper 66 may be attached to the frame 20 of a crane, such as the crane shown in FIG. 1.

The bumper 66 includes an elongated, tubular force-absorbing member 68 which will also be formed of a suitable resilient plastic material such as polyurethane. The force-absorbing member 68 has a longitudinally extending central opening 70 and is generally annular in cross-section. It is provided with a mounting base 72 of a reduced width, and the mounting base 72 has extending on opposite sides thereof longitudinally extending flanges 74.

The mounting of the force-absorbing member 68 is different from that described hereinabove. The flanges 74 are directly engaged and generally clamped by restraining members 76 which are in the form of elongated bars or straps. The restraining members 76 are spaced from the frame 20 by longitudinally extending spaces 78, and are secured to the frame 20 by means of suitable longitudinally spaced fasteners 80.

It is to be understood that the flanges 74, although they are only lightly clamped in place, have sufficient tensile strength with flanges 74 being sufficiently large to prevent the force-absorbing member 68 from being pulled between the restraining bars 76. On the other hand, the mounting of the force-absorbing member 68 is one which will permit lateral deflection (up and down) without undue fear of tearing the force-absorbing member from flanges 74. It is to be noted that the base of the force-absorbing member 68 bears directly against the frame 20 for applying direct forces thereto.

Reference is now made to FIG. 7 wherein there is illustrated still another form of bumper, generally identified by the numeral 82. The bumper 82 includes a force-absorbing member 84 which is in the form of a cylindrical block of resilient plastic material in accordance with this invention. This cylindrical block is modified so as to have formed in one end thereof a bore 86 which opens into a much enlarged bore 88, with the bores 86 and 88 defining an annular internal flange 90.

The mounting for the force-absorbing member 84 includes a mounting or backing plate 92 which is secured to a suitable frame structure, such as the frame 20, by means of bolts 94. The mounting plate has secured thereto a hub 96 which, in turn, carries a generally circular restraining member 98 in spaced-parallel relation to the mounting plate 92. There is further provided a mounting cup 100. The mounting cup 100 is welded to the mounting plate 93 in concentric relation to the hub 96.

It will be seen that the circular member 98 is received in the bore 88 and, thus, locks the force-absorbing member 84 to the mounting plate 92. On the other hand, the cup 100 receives the base of the force-absorbing member 84 and serves to position the same. The retention of the flange 90 is one which permits the force-absorbing member 84 to shift sideways in the event a front base 102 thereof does not directly engage an element which it strikes. However, the flange 90 is of sufficient size and strength so as to resist rupture or pull-through when the main body of the force-absorbing member 84 is deflected to one side of its axis.

Reference is now made to FIG. 8 wherein there is illustrated a combined rub-rail and line-attaching member for a boat. The combined rub-rail and line-attaching member is generally identified by the numeral 104 and includes a force-absorbing member 106 in the form of a block of a suitable resilient plastic material having a longitudinal bore 108 therethrough. The force-absorbing member 106 includes a mounting base 110 which is intended to engage in flush relation a transom or other part of a boat 112.

It is to be noted that the base 110 includes an upper offset portion 114 which may overlie the transom.

The force-absorbing member 106 may be provided with either a circular flange or two separate straight flanges 116, 118. The flange or flanges are engaged by restraining means 120 which may either be in the form of two bars or a ring.

There is associated with the vertical surface of the boat 112 a generally L-shaped clamp 122 which engages the lower portion of the restraining means 120. The clamp 122 has a horizontal flange 124 which engages the boat, and a vertical flange 126 which engages the restraining means 120. There is one or more fasteners 128 which passes through the vertical flange and is secured in the boat 112.

There is a second clamp 130 which engages the upper part of the boat 112 and acts on the upper part of the restraining means 120 to hold the flange 118 in place. Clamp 130 includes a vertical flange 132, which seats the boat, and a horizontal flange 134 which engages the restraining means 120 and has extending therethrough one or more fasteners 136 which are engaged directly with the boat 112. It is preferred that the restraining means 120 be fixedly secured to the clamps 122, 130 such as by welding.

It will be readily apparent that the force-absorbing member 106 may function as a rub-rail or bumper for the boat 112. At the same time, by having the opening 108 therethrough, it will be apparent that it may be utilized for tying lines to the boat. For example, the member 104 may be utilized for tie lines and the like.

Reference is now made to FIG. 9 wherein there is illustrated a vehicle 138 having a frame 140 on which there is mounted a bumper 142 by means of a pair of resilient bumper supports 144. Each of the bumper supports 144 includes a double-ended, force-absorbing member 146 with one end in abutment with the vehicle frame 140 and the opposite end in abutment with the bumper 142. Each end of the force-absorbing member 146 is provided with a restraining flange 148 in the manner of the bumper 22 of FIG. 1. Each flange 148 is provided with an annular groove 150 surrounding the force-absorbing member 146 which, once again, is in the form of a block of resilient plastic material of a suitable construction base.

One end of the force-absorbing member 146 is secured to the vehicle frame 140 by means of a clamp plate 152 which engages the respective flange 148 and a restraining ring 154 seated in the respective annular groove 150. The flange 148 at the opposite end of the force-absorbing member 146 is suitably secured to the bumper 142 by a like clamp flange 152 which engages a second restraining ring 154 seated in the annular groove 150 at the opposite end of the force-absorbing member 146.

It will be seen that while the supports 144 are primarily intended to absorb direct forces when the bumper 142 strikes another object, the mounting of the force-absorbing members 146 relative to both the vehicle frame 140 and the bumper 143 is such that they may be deflected sideways, or up and down, in accordance with the direction which the bumper is diverted while fully absorbing the force and without fear of rupture or the pulling out of the supports.

Reference is now made to FIG. 10 wherein the vehicle frame 140 is provided with a bumper 160 of the wrap-around type having end portions 162 extending longitudinally of the frame 140. The bumper 160 is mounted at opposite sides of the frame 140 utilizing the previously described supports 144.

It is to be understood that the bumper 160 may also be mounted relative to the forward portion of the frame 140 by additional supports 144 in the same manner as illustrated in FIG. 9.

Reference is now made to FIG. 11 wherein there is illustrated a pull device, generally identified by the numeral 164. The pull device 164 includes two links or sections 166, 168 which are joined together by a shock-absorbing intermediate unit 170. The shock-absorbing unit 170 includes a pair of cup members 170, 174 which are arranged in opposed spaced relation and which are connected together by a force-absorbing member 176. The force-absorbing member 176 is in the form of a block of plastic material of suitable tensile strength and suitable resiliency, such as polyurethane. The force-absorbing member 176 is provided at the opposite ends thereof with enlarged flanges 178, 180 which are received in the respective cups 172, 174. Each of the flanges 178, 180 has a transverse cross-section generally corresponding to the internal cross-section of its respective cup.

Each of the cups 172, 174 is partially closed at its open end by a restraining member in the form of a ring 182. It will be seen that the restraining rings 182 which are welded to the cup members 172, closely surround the force-absorbing member 176 and engage the flanges 178, 180 to prevent the withdrawal of the ends of the force-absorbing member 176 from the cup members 172.

The base of each cup member 172 is provided with a pin 184 having an enlarged head 186. Each pin 184 is coupled to a respective section of the tow unit 164 by a crevice 188. Each crevice 188 and its associated pin 184, which is rotated around the base of its respective cup member, provides a universal connection between the shock-absorbing unit 170 and the sections 166, 168 of the tow unit 164.

The material employed in making the shock-absorbing device of the present invention can be any of a number of resilient, deformable, low modulus materials including rubber and synthetic materials such as the polyurethanes. Because of its high tensile strength and good shock-absorbing characteristics, the polyurethanes are preferred. One polyurethane having particularly good properties for the disclosed application is ADIPRENE L-100 marketed by E. I. duPont de Nemours & Co., Inc. ADIPRENE L-100 is a liquid urethane elastomer which can be cured to a strong, rubbery solid by reaction of the isocyanate groups with polyamine or polyol compounds. When cured with MOCA (4,4'-methylene-bis-2-chloroaniline) utilizing 12.5 parts MOCA per 100 parts of ADIPRENE L-100, the urethane yields vulcanizates in the 88 to 92 hardness range (durometer A). The curing times are approximately one to three hours at 212° F. The elastomers have a tensile strength of approximately 4500 psi; an elongation at break of approximately 450%; a tear strength, Split, of 75 pounds per square inch; and a tear strength, Graves, of 500 pounds per square inch. The low modulus material can be selected depending upon the particular characteristics essential in the ultimate product. In accordance with the present invention, an important characteristic is that the flange of the force-absorbing member be solidly positioned against a high modulus material. Another important characteristic is that the size of the flange or lump of low modulus material held by the restraining member be of such size that the elongation of the low modulus material is exceeded before the material is drawn out. At times, however, it can be desirable to select the material and adjust the size of the flange in relation to the restraining member whereby the restraining member functions as a "safety valve" and pulls out before rupture. The low modulus material is to be substantially incompressible, changing shape only.

Although only preferred embodiments of the force-absorbing members formed in accordance with this invention have been specifically illustrated and described herein, it is to be understood that variations may be made in the structures including the mounting thereof without departing from the spirit and scope of the invention as defined by the appended claims. The structures essentially comprise attachment means for attaching a low modulus material to a high modulus material.

It is claimed:

1. A force-absorbing member formed of a resilient, deformable, low modulus material having at one end thereof a restraining flange on at least two opposite sides thereof, and restraining means engaging said flange for restraining said flange while permitting resilient deformation of said force-absorbing member to one side of its axis, and said restraining flange being of a size sufficient and of a material having tensile strength sufficient to prevent both the movement of said flange through said restraining means and rupture of said flange during said resilient deformation of said force-absorbing member, said restraining means being in the form of a fixed member engaging said flange with said flange being solidly positioned against a high modulus material.

2. A force-absorbing member according to claim 1 wherein said ring surrounds said force-absorbing member.

3. A force-absorbing member according to claim 1 wherein said ring surrounds said force-absorbing member and is seated in an annular seat in said flange.

4. A force-absorbing member according to claim 2 wherein said force-absorbing member is double ended and has a second restraining flange and second restraining means at the opposite end thereof.

5. A force-absorbing member according to claim 4 wherein said ring is seated in an annular seat in said flange.

6. A force-absorbing member according to claim 5 wherein said force-absorbing member is a mounting element for a vehicle bumper.

7. A force-absorbing member according to claim 5 wherein said force-absorbing member is a mounting element for a vehicle bumper, and opposite ends of said force-absorbing member and respective ones of said flange being in compressive engagement with a vehicle bumper on the one hand and a vehicle frame member on the other hand.

8. A force-absorbing member according to claim 6 wherein said force-absorbing member extends longitudinally of said vehicle.

9. A force-absorbing member according to claim 6 wherein said force-absorbing member extends transversely of said vehicle.

10. A force-absorbing member according to claim 1 wherein said force-absorbing member includes an abutment end portion within said flange, and clamp means connected to said restraining means engaging said restraining means to clamp said abutment end portion against a support.

11. A force-absorbing member according to claim 10 wherein said force-absorbing member is a bumper element.

12. A force-absorbing member according to claim 10 wherein said abutment end portion is stepped to engage a corner.

13. A force-absorbing member according to claim 10 wherein said abutment end portion is stepped to engage a corner and there are two separate clamp means.

14. A force-absorbing member according to claim 1 wherein said force-absorbing member is a combination boat rub-rail and line-attaching means and has a transverse bore.

15. A force-absorbing member according to claim 10 wherein said clamp means also directly engages said flange.

16. A force-absorbing member according to claim 15 wherein said clamp means is in the form of a clamp plate having an opening receiving said force-absorbing member, and spacers on said clamp plate limiting compressive engagement of said clamp plate with said flange.

17. A force-absorbing member according to claim 16 wherein said force-engaging member is a bumper and has an exposed free end.

18. A force-absorbing member according to claim 16 wherein said force-engaging member is a bumper and has an exposed free end, said force-engaging member being cylindrical and solid.

19. A force-absorbing member according to claim 16 wherein said force-engaging member is a bumper and has an exposed free end, said force-engaging member being part bulbous and hollow.

20. A force-absorbing member according to claim 10 wherein said force-absorbing member is elongated and said flanges being two in number and also elongated.

21. A force-absorbing member according to claim 1 wherein said restraining flange is entwined and said ring is generally seated within said force-absorbing member.

* * * * *